Feb. 11, 1947. C. G. TALBOT 2,415,713
AIRCRAFT SUPERCHARGER ARRANGEMENT FOR ENGINE AND CABIN
Filed Nov. 11, 1944
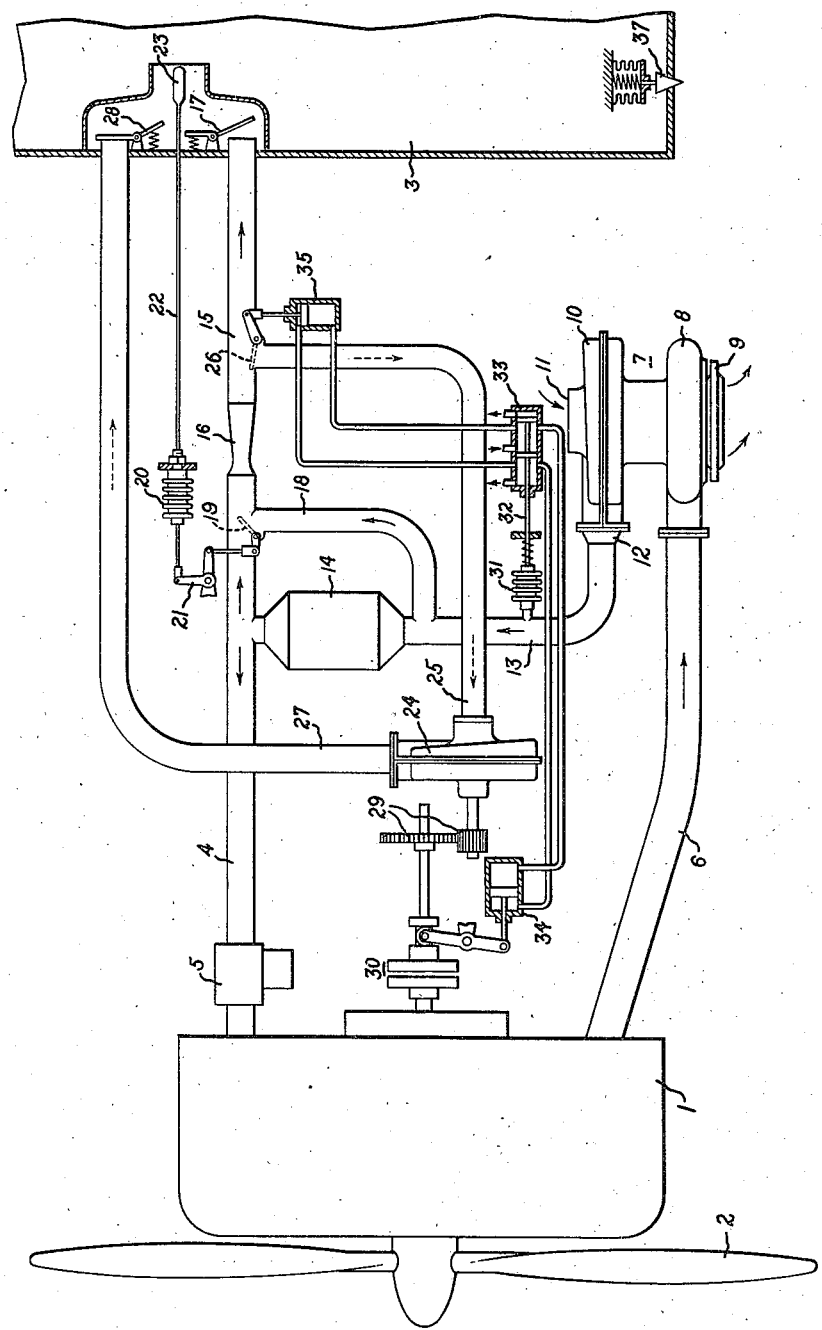
Inventor:
Curtis G. Talbot,
by Harry E. Dunham
His Attorney.

Patented Feb. 11, 1947

2,415,713

UNITED STATES PATENT OFFICE 2,415,713

AIRCRAFT SUPERCHARGER ARRANGEMENT FOR ENGINE AND CABIN

Curtis G. Talbot, Scotia, N. Y., assignor to General Electric Company, a corporation of New York Application November 11, 1944, Serial No. 563,012

3 Claims. (Cl. 244—59)

The present invention relates to aircraft supercharger arrangements including compressor means for supplying air under pressure to an aircraft engine and to a cabin. More specifically, the invention relates to the type of arrangement including a centrifugal type compressor for supplying compressed air to both an internal combustion engine and a cabin. Difficulties are experienced with this type of arrangement due to the different demands for compressed air by the engine and the cabin, the demand for air by the cabin depending primarily upon changes in altitude whereas the demand for compressed air by the engine depends upon both changes in altitude and changes in engine output, decreasing with reduced engine output, for example, during cruising operation.

The object of my invention is to provide an improved aircraft supercharger arrangement of the kind above specified whereby both the demand for compressed air by the engine and the cabin may be readily met during widely varying operating conditions. This is accomplished in accordance with my invention by the provision of a first supercharger or supercharger stage connected to supply air to both engine and cabin and a second supercharger or supercharger stage arranged for series connection between the first supercharger stage and the cabin upon a certain operating condition of the first supercharger stage.

For a better understanding of the above and other objects of my invention, attention is directed to the following description and the claims appended thereto in connection with the accompanying drawing.

The single figure of the drawing illustrates diagrammatically an aircraft supercharger arrangement in accordance with my invention.

The arrangement comprises an internal combustion engine 1 driving a propeller 2 and an aircraft cabin 3. The engine has an inlet manifold connected to a conduit 4 including a carburetor 5 and an exhaust manifold connected to an exhaust conduit 6. The exhaust gases discharged through the latter are utilized to operate a turbosupercharger 7 including a turbine having a manifold 8 connected to receive gases from the exhaust conduit 6 and discharging such gases to a bucket wheel 9 for driving a first compressor 10 having an inlet conduit 11 for receiving air from the atmosphere and a scroll 12 connected to a supply conduit 13. The latter includes a heat exchanger or cooler 14 with two branches, the aforementioned conduit or branch 4 connected to the inlet manifold of the engine, and another branch or conduit 15 including a restriction or venturi 16 and connected to the cabin 3. The venturi is dimensioned to limit the flow of air through the conduit 15. A spring-biased valve 17 in the cabin is associated with the discharge end of the conduit 15 to close the latter upon failure of fluid flow therethrough. The arrangement includes means to heat-condition the air conducted to the cabin 3. This means comprises a bypass conduit 18 for bypassing some of the air from the inlet of the cooler 14 to the conduit 15.

The air-flow through the bypass 18 is controlled by a valve 19, which latter is positioned in response to temperature changes in the cabin by means of a temperature responsive device in the form of a bellows 20 having a movable left-hand end connected to the valve 19 by a bell-crank lever 21 and a rigidly supported right-hand end communicating through a pipe 22 having a sealed bulb 23 at its end located within the cabin 3. The bulb and the pipe 22 are filled with a suitable fluid. During operation increasing temperature in the cabin causes expansion of this fluid whereby the bellows 20 is expanded, thereby effecting movement of the valve 19 to decrease the flow of hot fluid through the bypass 18 and simultaneously increasing the flow of cool fluid from the outlet of the heat exchanger 14 to the conduit 15, resulting in a fluid mixture in the outlet of the conduit 15 of lower temperature whereby the temperature in the cabin is reduced. Similarly, upon a drop in cabin temperature the bellows collapses, thereby positioning the valve 19 to increase the temperature of the fluid mixture in the outlet of the conduit 15 and the cabin.

The arrangement so far described comprises a single turbosupercharger or supercharger stage for supplying air under pressure to both the engine and the cabin and means for temperature conditioning the air supplied to the cabin. The amount of air thus supplied to the cabin and the engine depends upon the operation of the engine which furnishes the exhaust gases for driving the turbosupercharger. While this amount of air suffices for properly operating the engine it is insufficient for properly supercharging the cabin during cruising operation of the engine at high altitude. In order to supercharge the cabin during cruising operation a second stage or supercharger is arranged for series connection between the conduit 15 and the cabin together with means for automatically engaging said second supercharger upon certain operating conditions. In the embodiment illustrated in the drawing a second supercharger or centrifugal compressor 24 is provided having an inlet conduit 25 connected to the conduit 15 at a point beyond the connection of the conduit with the bypass 18 and the venturi 16 as regards the direction of flow therethrough. A valve 26 is provided in the connection between the conduits 25 and 15 which in one position as shown closes the conduit 25 and in another position disconnects the conduit 15 from the cabin and connects the latter to the conduit 25. The compressor 24 has a discharge conduit 27 connected to the cabin. A spring-biased valve 28 is associated with the outlet of the conduit 27 to close said outlet upon failure of flow of fluid through the conduit 27. The compressor 24 is driven from the engine crankshaft by means including a speed-increasing gearing 29 and a clutch 30. In the position shown the compressor 24 is out of operation, the coupling 30 therefor is open; the valve 28 is closed, and the valve 26 is held in position closing the end of the conduit 25.

The arrangement as stated before includes means for automatically placing the compressor 24 in operation in response to a certain operating condition of the turbo-supercharger 7. In the present example the automatic actuating device for the second supercharger includes means responsive to changes of the fluid condition in the discharge conduit 13 of the first compressor. This means is in the form of a bellows 31 rigidly supported at its left-hand end and connected to the conduit 13. The right-hand end of the bellows is connected by a stem 32 to a pilot valve 33 for controlling the displacement of fluid in two servomotors, a servomotor 34 for actuating the clutch 30 and another servomotor 35 for actuating the valve 26. In the position shown the piston of the servomotor 35 is in its upper end position and that of the servomotor 34 is in a left-hand end position. Fluid under pressure is supplied through the pilot valve 33 to the underside of the piston in motor 35 and to the right-hand side of the piston in the motor 34. If the pressure in the conduit 13 drops to a certain value the bellows 31 collapses and thereby moves the pilot valve 33 toward the left. In this position, operating fluid under pressure is supplied through the pilot valve to the upper face of the piston in the servomotor 35 and discharged from the lower face thereof moving the valve 26 into its other end position, thereby disconnecting the conduit 15 from the cabin and connecting it in series to the conduit 25. At the same time fluid under pressure is supplied from the pilot valve to the left-hand face of the piston of the servomotor 34 and discharged from the right-hand face thereof, resulting in closing movement of the clutch 30 to connect the supercharger 24 to the crankshaft of the engine 1.

In order to effect circulation of air through the cabin the latter has an outlet controlled by a suitable mechanism including a valve 37.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States is:

1. Aircraft supercharger arrangement comprising an engine, a cabin, a first compressor having a discharge conduit with a first branch connected to the engine and a second branch connected to the cabin, a second compressor having an inlet conduit connected to the second branch and an outlet connected to the cabin, valve means associated with said inlet conduit and second branch, means including a gearing and a clutch for driving the second compressor from the engine, and means including a device responsive to pressure changes in the discharge of the first compressor for actuating said valve means and said clutch.

2. A supercharging system for an aircraft engine and cabin comprising a turbosupercharger having a compressor arranged to induct ambient atmospheric air and driven by a turbine arranged to receive exhaust gases from the engine, a discharge conduit connected to the compressor, a cooler in the discharge conduit, first and second branch conduits from the discharge side of the cooler connected to the engine and to the cabin respectively, a second compressor, means for driving the second compressor from the engine and including clutch means for disengaging the driving means, an inlet conduit arranged to supply air from the second branch conduit to the inlet of the second compressor, a discharge conduit for conducting air from the second compressor to the cabin, valve means associated with the second branch conduit and the inlet conduit and arranged to close the inlet conduit and direct flow through the second branch conduit to the cabin in one position and to shut off the flow of air from the second branch conduit to the cabin and simultaneously direct the flow into the inlet conduit in a second position, motor means arranged to actuate said clutch and valve respectively, and automatic condition-responsive pilot means sensitive to an operating condition of the turbosupercharger and arranged to actuate the valve and clutch so as to move the valve to its second position and simultaneously to engage the clutch for driving the second compressor.

3. A supercharging system for an aircraft engine and cabin comprising a turbosupercharger having a compressor arranged to induct ambient atmospheric air and driven by a turbine arranged to receive exhaust gases from the engine, a discharge conduit connected to the compressor, a cooler in the discharge conduit, first and second branch conduits from the discharge side of the cooler connected to the engine and to the cabin respectively, a second compressor, means for driving the second compressor from the engine and including clutch means for disengaging the driving means, an inlet conduit arranged to supply air from the second branch conduit to the inlet of the second compressor, a discharge conduit for conducting air from the second compressor to the cabin, valve means associated with the second branch conduit and the inlet conduit and arranged to close the inlet conduit and direct flow through the second branch conduit to the cabin in one position and to shut off the flow of air from the second branch conduit to the cabin and simultaneously direct the flow into the inlet conduit in a second position, motor means arranged to actuate said clutch and valve respectively, automatic condition-responsive pilot means sensitive to an operating condition of the turbosupercharger and arranged to actuate the valve and clutch so as to move the valve to its second position and simultaneously to engage the clutch for driving the second compressor, a bypass conduit connected to the second branch conduit and arranged in parallel with said cooler, second valve means for regulating the flow from the inlet side of the cooler to the second branch conduit, and second condition-responsive means sensitive to cabin air supply temperature and arranged to actuate the second valve means to control said temperature.

CURTIS G. TALBOT.

REFERENCES CITED

The following references are of record in the file of this patent:

UNITED STATES PATENTS

| Number | Name | Date |
|---|---|---|
| 2,350,896 | Jde | June 6, 1944 |
| 2,309,064 | Gregg et al. | Jan. 19, 1943 |
| 2,063,477 | Young et al. | Dec. 8, 1936 |
| 1,779,160 | Diehl | Oct. 21, 1930 |